United States Patent [19]

Morley

[11] Patent Number: 4,506,362

[45] Date of Patent: Mar. 19, 1985

[54] SYSTEMATIC MEMORY ERROR DETECTION AND CORRECTION APPARATUS AND METHOD

[75] Inventor: Richard E. Morley, Mason, N.H.

[73] Assignee: Gould Inc., Rolling Meadows, Ill.

[21] Appl. No.: 401,974

[22] Filed: Jul. 26, 1982

Related U.S. Application Data

[63] Continuation of Ser. No. 972,440, Dec. 22, 1978, abandoned.

[51] Int. Cl.³ ..................... G06F 11/10; G11C 29/00
[52] U.S. Cl. ......................................... 371/13; 371/38
[58] Field of Search ........................... 371/13, 38, 21;
365/222, 200, 201

[56] References Cited

U.S. PATENT DOCUMENTS

| | | | |
|---|---|---|---|
| 3,893,071 | 7/1975 | Bossen et al. | 371/38 |
| 4,100,403 | 7/1978 | Eggenberger et al. | 371/21 |
| 4,112,513 | 9/1978 | Elsner | 365/222 |
| 4,139,148 | 2/1979 | Scheuneman et al. | 371/38 |
| 4,175,692 | 11/1979 | Watanabe | 371/13 |
| 4,183,096 | 1/1980 | Cenker et al. | 365/222 |
| 4,185,269 | 1/1980 | Hodges et al. | 371/38 |

OTHER PUBLICATIONS

*Electronics*, Oct. 12, 1978, "Error Correction Enhances RAM Board for 16-Bit Single-Board Microcomputer", pp. 51-52.
*Electronics*, Nov. 10, 1977, "The CCD's Future Takes on a Bright Hue", pp. 65-66.
Intel Corporation, Component Data Catalog, 1978, pp. 5-7 through 5-14, "65,536 Bit CCD Serial Memory".
T. C. May, M. H. Woods, "A New Physical Mechanism for Soft Errors in Dynamic Memories", *Intel Corporation*, circa 1978.
Hobbs Associates Newsletter, "Computer and Data Processor Technology", 9/1978, 3 pages.
G. H. Smith & C. H. Wolff, "Substitute Memory Location Assignment for Faulty Locations", *IBM Technical Disclosure Bulletin*, vol. 12, No. 9, 2/1970, pp. 1441-1442.
E. L. Walker, "Field Alterable Redundancy for Dynamically Ordered Block Oriented Memory", *IBM Technical Disclosure Bulletin*, vol. 16, No. 9, 2/1974, pp. 3096-3097.
B. M. Cassidy et al., "Circuit Redundancy", *IBM Technical Disclosure Bulletin*, vol. 17, No. 9, 2/1975, pp. 2596-2598.
N. T. Christensen & A. K. Pattin, Jr., "Stuck-Track Error Correction", *IBM Technical Disclosure Bulletin*, vol. 13, No. 7, 12/1970, pp. 1844-1846.

(List continued on next page.)

*Primary Examiner*—Charles E. Atkinson
*Attorney, Agent, or Firm*—F. Eugene Davis, IV

[57] ABSTRACT

A systematic data memory error detection and correction apparatus periodically reads data from each addressable memory location, determines the presence or absence of an error in the addressed data memory location and, if an error is detected, corrects the error and writes the corrected data back into the addressed memory location. The apparatus may include circuitry for logging those areas of the data memory where errors have been detected, such logging showing either the address location where an error is detected or alternatively indicating the repetitiveness of an error at any particular addressed memory location. Such data logging facilitates determination of hardware or "hard" type errors as distinguished from non-hardware or "soft" type errors. The latter type errors are typically found in dynamic random access memories (dynamic RAM's) which occasionally and randomly have errors due to bombardment of cosmic energy and alpha particles, the latter typically due to minute radioactive elements in silicon materials used in the fabrication of such memories. When the present apparatus is used in conjunction with dynamic RAM's, the error detection and correction is typically performed during "refresh" times which are necessary for maintaining proper stored charge in such devices. By so doing, the access performance of the memory is not degraded by the error detection and correction apparatus.

39 Claims, 4 Drawing Figures

OTHER PUBLICATIONS

B. Rickard, "Automatic Error Correction in Memory Systems", *Computer Design*, 5/1976, pp. 179–182.

*Electronics*, "CCD's Receive Two-Pronged Boost", Mar. 15, 1979, pp. 53–54.

*Electronics*, "Intel to Disclose 16-K Static Secrets and to Release Soft-Error Data", Nov. 22, 1979, p. 40.

*Electronics*, "Do Cosmic Rays Spell Death for VLSI?", Nov. 22, 1979, pp. 44, 46.

*Electronics*, "Applying the Hamming Code to Microprocessor-Based Systems", Nov. 22, 1979, pp. 103–110.

*Electronics*, "Memory Finds and Fixes Errors to Raise Reliability of Microcomputer", Jan. 3, 1980, pp. 168–172.

J. F. Ziefler & W. A. Lanford, "Effect of Cosmic Rays on Computer Memories", *Science*, vol. 206, Nov. 16, 1979, pp. 776–788.

FIG. 1

MEMORY SPACE

← COHERENT ERROR

SYSTEMATIC MEMORY ERROR DETECTION AND CORRECTION APPARATUS AND METHOD

This application is a continuation of application Ser. No. 972,440, filed Dec. 22, 1978, now abandoned.

TECHNICAL FIELD

The present invention relates to apparatus for detecting and correcting errors in data memories and in particular dynamic random access memories. Such memories typically require a refreshing of all the data bits in order to maintain the data bits in either an ON (or "1") or OFF ("0") state.

BACKGROUND ART

It has recently been found, as evidenced by an article entitled "A New Physical Mechanism for Soft Errors in Dynamic Memories" by Timothy C. May and Murray H. Woods of Intel Corporation, Santa Clara, Calif. 95051, (a copy of which will be on file in the Patent and Trademark Office file for this invention) that a new physical soft error mechanism in dynamic random access memories (dynamic RAM's) and charge-couple devices (CCD's) is probably responsible for generating random errors in such memories by passage of ionized radiation through the memory array areas. It is suspected that alpha particle radiation can have sufficient energy to upset the state of particular memory bits within such memory devices.

A definition of "soft errors" is set forth as random, non-recurring, single bit errors in memory devices. Such errors are not permanent; that is, no physical defects are associated with the failed bit. In fact, a bit showing a soft error is completely recovered by the following WRITE cycle with no greater chance of showing an error than any other bit in the device. Since such errors are of a random nature and since they apparently are due to artificial sources such as polonium-210 and thorium-230, as well as natural sources such as uranium/thorium minerals which are present in the silicon materials forming such memory devices, they pose a problem for such memory devices.

In the past it has been a goal to reduce the incidence of such soft errors by such techniques as increasing the number of electrons necessary to differentiate between "empty" and "full" wells associated with such dynamic memories. In essence, such memories store a 0 or 1 by the respective emptiness or fullness of the associated bit well. It is known that by requiring more electrons to designate a "full" well, the chances of such soft errors are reduced. However, the more electrons necessary for designating a full well, the greater the physical size required for that particular data bit. This is obviously contrary to the goals of obtaining tighter memory packing densities. At present approximately 100,000 electrons are necessary for designating a "full" well in the highest density dynamic memory devices available. If the number of electrons is further reduced, the probability of soft errors dramatically increases as noted in the May et al article.

The present invention provides a unique and simple solution to this problem of soft errors whether they be with respect to dynamic RAM's or any other type of data memory device. Specifically, the present invention systematically examines each addressable memory location in the memory device and by use of standard error or Hamming codes determines the presence or absence of an error in that particular addressable memory location. Typically, such addressable memory locations use one or more data bytes; that is groups of 8 bits of data.

If an error is detected, the error correction code, via standard technology provides the necessary information to correct the soft error which in turn is then systematically rewritten into the memory location so that the memory location then stores the correct data. Since the review of each addressable memory location is performed on a systematic and relatively short time period basis (such as 1-10 seconds for the entire memory device), the chances of a multiple soft error occurring in any particular addressable memory location is virtually zero. Thus, the integrity of the memory is maintainable over an extended time period, and the fact that soft errors occur randomly throughout the memory device is completely irrelevent to the maintenance of the memory integrity.

Furthermore, use of the present invention's systematic memory detection and correction apparatus with dynamic memory devices, fewer electrons are necessary to designate a "full" well (a 1 state) than is presently feasible without usage of the present invention. Therefore, higher packing densities for such memory devices is a direct consequence of utilization of the present invention.

DISCLOSURE OF THE INVENTION

The present invention is directed to a systematic memory error detection and correction apparatus for use with data memory devices normally associated with digital computers. Specifically, the present invention systematically reads each addressable memory location within the memory device, determines whether an error exists in the read data, and if an error exists, corrects the error and writes the corrected data back into the same addressable memory location. By performing this error detection and correction for each addressable memory location on a systematic basis—typically within 10 seconds or less for the entire memory device—the chance of having more than one "soft" error occur within that time span is virtually zero. Therefore, the present invention is able to maintain memory integrity for extended periods of time for the entire memory device regardless of the propensity of that particular memory device to undergo random soft errors due to bombardment from alpha particles and the like.

The present invention when utilized in conjunction with dynamic RAM's, is able to perform its systematic memory error detection and correction during the refresh cycle and thus does not impair the throughput of the memory.

The present invention by eliminating the random "soft" errors in memories and specifically with respect to dynamic memories is therefore able to allow for tighter packing densities by utilizing less electrons for designating a "full" well (an ON or 1 state) than is possible with current dynamic RAM's.

BEST MODE OF CARRYING OUT THE INVENTION

Figure 1:
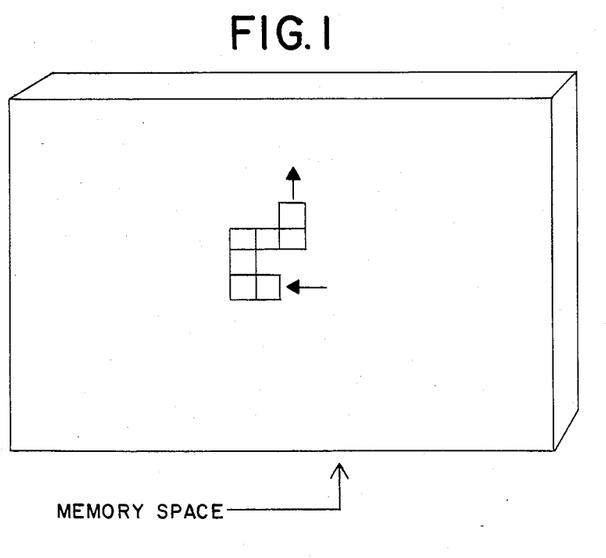
FIG. 1 diagrammatically illustrates the memory space of a typical memory device depicting "program" execution.

FIG. 1 depicts an ideological memory space found in a typical memory device such as a dynamic RAM or any other type directly addressable of memory utilized in the digital computer art. In this memory space a symbolic program, when run, is executed. Programs generally operate non-randomly in the address space. There are sections of memory that are truly never accessed and there are also sections that are accessed heavily.

Figure 2:
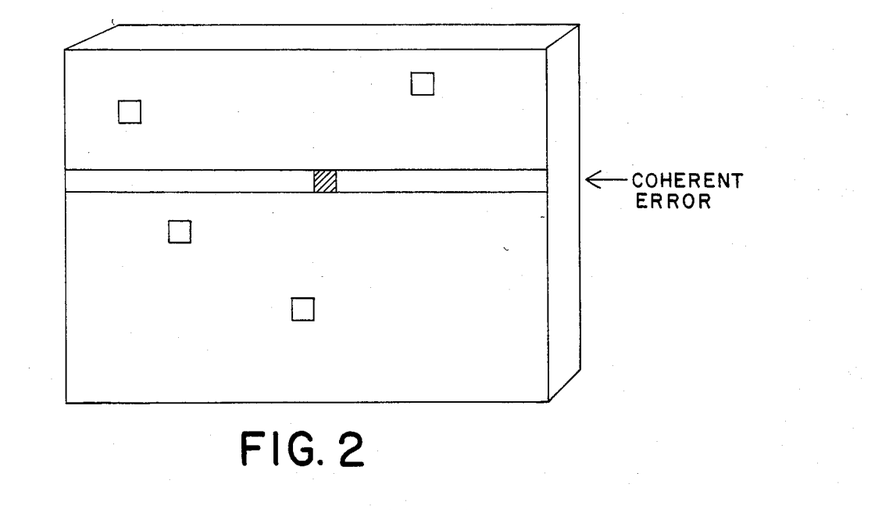
FIG. 2 is a diagrammatic representation of a typical memory device illustrating the sort of "soft" errors which can occur at a particular data bit location within the memory device.

FIG. 2 illustrates that error rates can be envisioned in a very simplistic diagram as random errors occurring in this same memory space as shown in FIG. 1. Such random errors are typically of the "soft" type: that is, they occur randomly and are not due to hardware malfunctions but due to a random change of state at a particular memory bit location due to bombardment from alpha particles and the like.

There is also another source of errors called "hard" errors or coherent errors. These occur when mechanical defects occur in the equipment such as semiconductor damage, or large power supply transients. Generally such errors will cause a two bit or more error to occur within any particular memory byte and is therefore noncorrectable for an eight bit byte unless an error correction code greater than a five bit Hamming code is utilized. Thus, in conception there is no difference between a two bit error in a given region (i.e. data byte) and a totally malfunctioning semiconductor component. Such errors, depending upon the Hamming code utilized, may be detectable but uncorrectable and of course if they are due to a hardware malfunction, are usually uncorrectable in the memory even if the Hamming code is large enough to determine which bits of the data byte are incorrect.

The general philosophy of error correcting codes is to correct the "soft" errors upon reading the data. That is, running the program upon retrieving data from memory and correctng this information in memory before presenting it to the central processing unit (CPU). Clearly, therefore only those memory locations that are used on a high-rate basis will be substantially affected by error correcting techniques as now utilized. There are subsequent programs, however, that detect "hard" errors; that is, non-correctable errors and isolate that region of the memory space so as to remap the program around those defective errors. Symbolically, the program is detoured about those roads that are impassable. Most error correcting codes can detect errors of two bits but can only correct errors of one bit.

In the present invention all memory locations within the memory device are refreshed on a background basis totally transparent to the utilization of the memory space by the interconnected central processing unit. This refreshing is performed even transparent to the firmware in a distributed processing system. Both digital and analog refresh are handled by the present invention and the entire memory can be refreshed in this memory in some finite period of time, typically on the order of seconds. The analog refreshing is the maintaining of the state of the memory which is necessary specifically for dynamic memory devices. Digital refreshing is that performed by the present invention to correct detected "soft" errors in addressable memory locations. Not only is the error detected and corrected, but is also then rewritten into the addressable memory location. Indeed, even if the digital refreshing of the memory took hours, it nevertheless would have significant validity in the probability of extracting valid data from a little used section of memory address space. In effect all "soft" errors from the memory device are detected and corrected within a short finite time period by the systematic memory error detection and correction apparatus of the present invention.

Upon detection of a "hard" error, the present invention can manipulate the appropriate address lines, including the chip-select lines and physically re-map the address space onto some spare semiconductor elements. In order to maintain simplicity, such re-mapping of the address space should typically be performed on a single chip level. The implication is that an entire chip-select signal can be switched to another sixteen thousand-bit chip location (or other size chip if utilized in the memory device) in a spare area of the board upon which the memory device is located.

In the preferred embodiment of the present invention, a correcting code is utilized with eight bits of data (one byte). This allows the error detection and correcting apparatus to operate in a clean manner with the high speed parallel channels from the external world, as are disclosed and claimed in co-pending U.S. patent application Ser. No. 916,274, now issued as U.S. Pat. Nos. 4,276,594 of June 30, 1981 assigned to the same assignee as the present invention. In this manner the apparatus can operate effectively with the microprocessors used both on the memory—input/output (MIO) board and the microprocessor directly on the memory plane. If a 32-bit data word is used with error correction code, extraction and rewriting of bytes in that data word can have significant impact on both speed and manipulation of data. Thus, the preferred embodiment of the present invention utilizes the concept of using semi-conductors as opposed to intelligence whenever possible and thus has opted for increased size of byte error correction.

To summarize, the present invention can correct "soft" errors, can, depending upon its implementation, isolate "hard" errors, can, depending upon its implementation replace chips that have "hard" errors, can refresh all memory locations and can utilize, if desired, a byte size error correcting code format.

Figure 3:
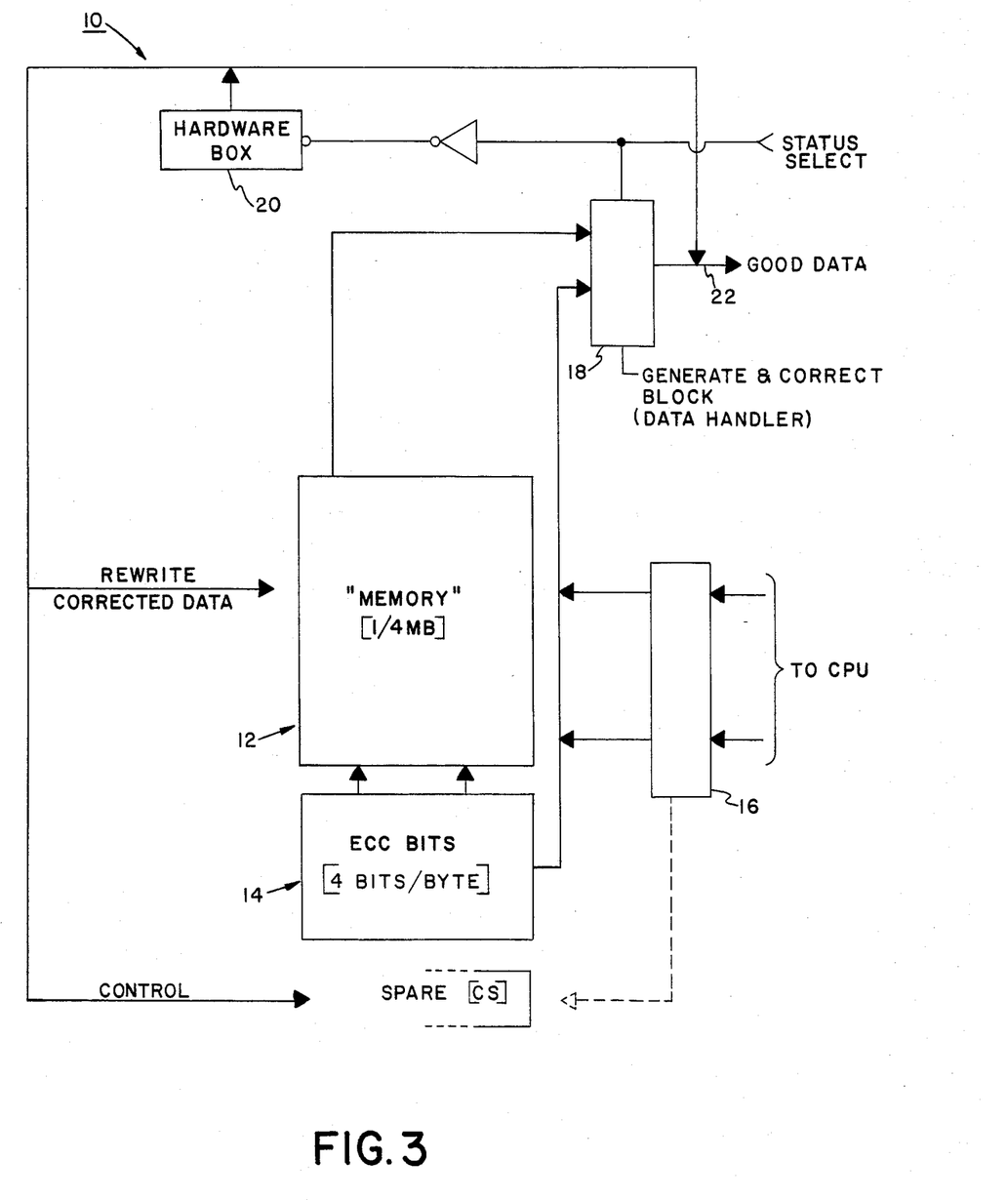
FIG. 3 is an overall block diagram of implementation of the systematic memory error detection and correction apparatus as used with a typical memory.

As best seen in FIG. 3, the major components of the systematic error detection and correction system 10 are the addressable memory 12, error correction code bits in memory 14, central processing unit interface 16, data handler 18, and a hardware module 20. All of these components are preferably mounted on a single memory board. A microprocessor (not shown) is associated with the systematic error detection and correction system 10 having the function of a refresh digital cycle associated with the error correcting scheme. It may additionally switch in spare memory chips when "hard" errors are encountered. This microprocessor may also examine multiple bit errors in a single byte to determine if they are indeed "hard" errors; that is, whether or not they are due to a hardware failure. When all of the spare chips are used up, the microprocessor can also attempt to re-use the earlier hard memory chips that were previously isolated. This is due to the fact that there is a finite, but very low probability, that scanning of these earlier discarded "hard" error chips will produce chips that are indeed not faulty but merely contain a multi-bit error in a particular addressable memory location.

The microprocessor also prevents the error correcting system from totally aborting at any time. In a normal refresh cycle, memory 12 is read and sends out 12 bits to the data handler. On a refresh read or a regular read from the outside world; that is, a read from the CPU interconnected to CPU interface 16, the data handler indicates whether or not any of the 12 bits in the memory and the error correction code array 14 is incorrect. If the data is good, nothing further happens other than to make the data available on the GOOD DATA bus 22.

If the read data contains an error and if the read came from the outside world, refreshing by a standard system access would not occur. Then corrected data is passed along the GOOD DATA bus 22, however, an indication is made that an error was noted in this data prior to transmittal to the central processing unit.

If, on the other hand, the read was part of the refresh cycle associated with maintaining the integrity of memory 12 and ECC bit memory 14, the error is corrected and rewritten into memory 12 and ECC bit memory 14. This latter memory is in essence part of or an adjunct of memory 12. In essence corrected data is then looped back around to the circuitry so as to correct the error read from memory 12 or ECC bit memory 14. However, this writing back of information may or may not occur during the same refresh cycle depending upon the time constraints associated with memory access. Hardware module 20, as more fully described later, is used to accomplish the writing back into memory 12 and ECC bit memory 14. This hardware module contains a small amount of information about the most recent error so that the interconnected computer can ascertain what is occurring.

Thus, in summary the systematic error detection and correction system 10 provides for reading of data from memory to an interconnected central processing unit via the CPU interface 16 which has data transferred to it by the GOOD DATA bus 22 after the data is error checked by use of the error correction code bits. To this extent the present invention utilizes state of the art technology. However, the generating and correct block 18 in conjunction with the hardware block 20 provides for refreshing of the data in memory 12 and ECC bit memory 14. Again the refreshing of such data is well known in the art for dynamic memories. However, while performing the refreshing of all the data in memory the data handler in conjunction with the hardware block 20 systematically examines each addressable memory location in memory 12 and the associated error correction code bits in memory 14 to determine if that particular addressable memory location contains an error. If an error is detected and is of a single bit nature, that is a "soft" error, this error is corrected by the data handler and through the hardware block 20 is caused to be rewritten into the memory and ECC bit memory so as to maintain the integrity of that particular addressable memory location.

During each refresh cycle, a different addressable memory location is read from memory 12 and associated ECC bit memory 14 so that after a short period of time, typically in the order of several seconds for a 16 kilobyte size memory, every addressable memory location in the memory is read, examined for errors, and if an error is detected, rewritten with the corrected data.

Thus, the chances of a random error occurring in a particular location of the memory and having this error stay for a long period of time due to non-access of that memory by the CPU, is eliminated. Furthermore, the chances of such an error being of a multi-bit nature due to the fact that it is not accessed for a long period of time is also eliminated by the present invention. Thus, memory integrity is preserved in the memory space.

Figure 4:
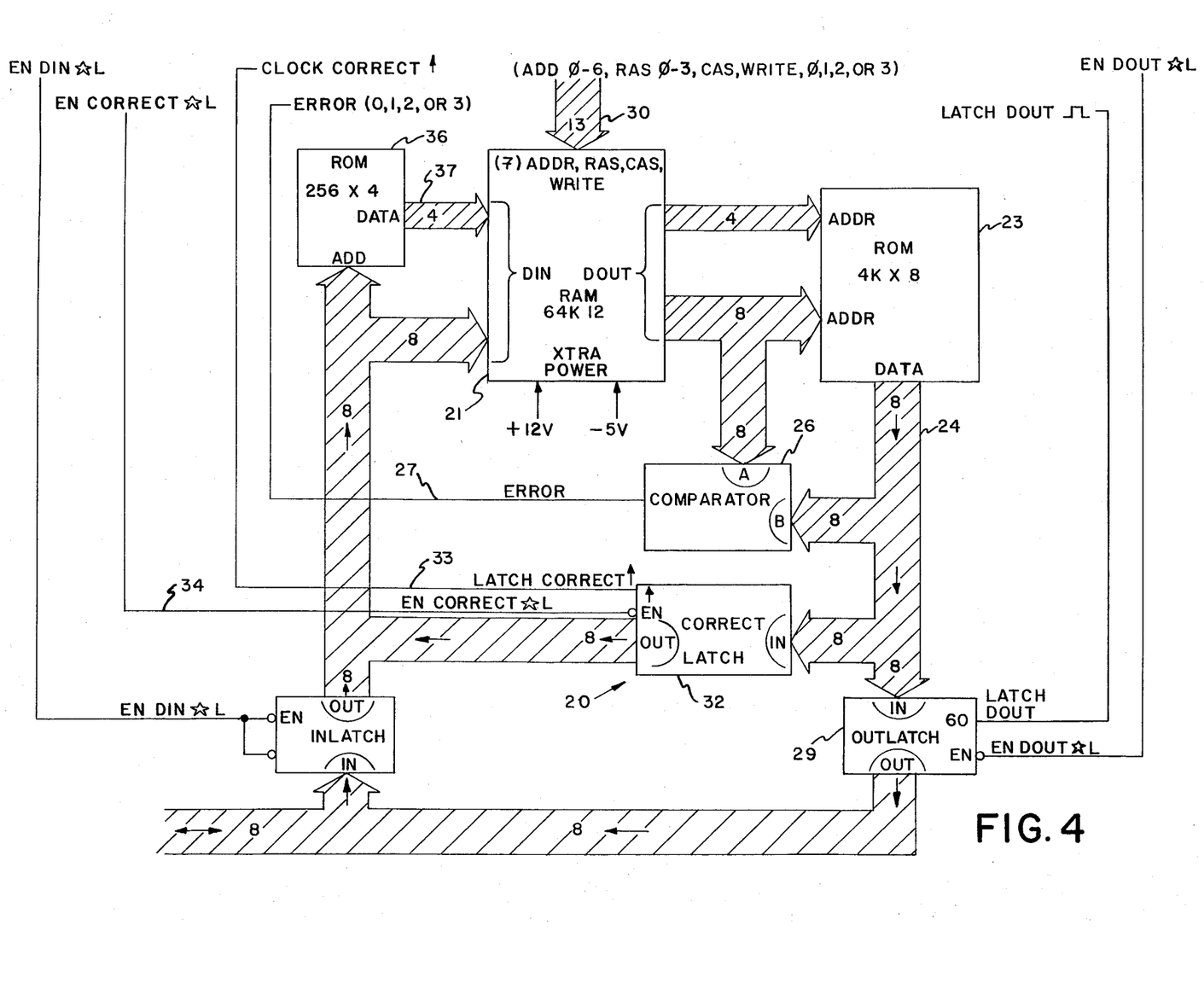
FIG. 4 is a more detailed block diagram of the present invention's implementation.

A more detailed block diagram of the systematic memory error detection and correction system is shown in FIG. 4. There, memories 12 and 14 are both contained in RAM 21. Upon receiving a read, the 12 bits are transferred to a mapping ROM 23 where 8 bits of data are generated and placed on data bus 24 and transferred to comparator 26. These 8 bits are determined by the received 12 bits and corrected for any single bit soft error within the 12 bits. There, the 8 bits of corrected data (if correction was required) are compared with the originally transferred 8 bits forming memory 12 shown in FIG. 3 to determine if there is a difference between the two bytes. If there is an error, a signal is generated along line 27 which indicates the presence, absence or nature of the error. If the reading of data from RAM 21 is due to a CPU access, then the corrected data as generated by the mapping ROM 23 is transferred to output latch 29 and transferred to the CPU. If, however, the access from RAM 21 is due to a refresh read, that is, a periodic reading of data at each addressable memory location within RAM 21 as generated by the row address strobe (RAS) and column address strobe (CAS) as shown by bus 30 entering RAM 21 (the generation of such signals being well known in the art), then the corrected data is held in a correct latch 32 until receipt of proper signals 33 and 34 from the interconnected microprocessor which then causes the corrected data to be properly transferred back to the RAM 21 so as to be rewritten in the same addressable memory location from which the data containing the error was originally read. Furthermore, the 8 bits of data are transferred to an error correcting code generating module 36 so as to generate the 4 bits of the Hamming code to be associated with the byte of data. These 4 bits are then transferred along bus 37 back into the correct addressable memory location within RAM 21. Thus, during each refresh cycle, a different addressable memory location within RAM 21 is selected for error detection and correction so that all the addressable memory locations within the RAM are examined within a short period of time, typically on the order of a few seconds.

Since the examination of each addressable memory location within the RAM 21 is performed during the same time that refreshing of all the data bits within the is performed, throughput time with respect to the memory is not degraded in any respect by this systematic error detecting and correcting invention.

Thus, what has been described is a systematic error detection and correction apparatus for use with addressable data memories so as to allow for a systematic reading of each addressable memory location, error detection and correction of each read addressable memory location, and rewriting of corrected data back into the addressable memory location, all being performed as the memory is utilized in conjunction with an interconnected central processing unit or other data manipulation or transferring device. When the present invention is utilized with dynamic memories requiring periodic refreshing of all data bits within the memory, the systematic error detection and correction can be performed during the same time that this refreshing occurs, thus minimizing or eliminating any interference with the operation of the memory in conjunction with the interconnected CPU or other device.

By systematically detecting and correcting all "soft" errors within the memory space, integrity of the memory is always maintained. The problems associated with random "soft" errors occurring from alpha particle bombardment of the memory cells within the memory is therefore effectively remedied. This in theory allows for tighter packing densities for such dynamic memories since fewer electrons are necessary for designating a full state in their memory cells. In the past, utilizing less than one hundred thousand electrons for designating a full state in a memory cell was at least commercially unfeasible since the probability of such memory cells undergoing a random error due to bombardment from alpha particles and the like became too great over any typical period of time associated with mean access time for a memory location. The present invention by periodically reading and correcting such data thus eliminates this problem and allows for memory cells which otherwise would be unacceptable to be completely acceptable.

Thus, a simple and elegant solution to a perplexing problem in the digital memory art has been disclosed.

It will thus be seen that the objects set forth above and those made apparent from the preceding description are efficiently obtained and since certain changes may be made in the above apparatus and method without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described, and all statements of the scope of the invention which as a matter of language, might be said to fall therebetween.

Having described the invention what is claimed is:

1. For use in a digital computer system comprising a data memory and at least one data user, a memory system for storing and retrieving data for the data user comprising:
    A. means for storing W words of original N bits of data in W words of N+M flip-flops to provide for error correction, such that a change in one of the N+M flip-flops in only one of the W words does not prevent the retrieval of the original N bits stored in that word, and wherein W, N and M are positive integers, W being very much greater than N and M;
    B. means connected to said storing means to retrieve therefrom for a data user the original N bits stored in any word of the W words in spite of an error in one of the N+M flipflops in that word;
    c. means connected to said storing means and said retrieval means to purge from said storing means an error in a single flip-flop of one of the W words by causing said retrieval means to retrieve the original N bit word stored in the N+M flip-flops, such that if an error was present in one of the flip-flops before the purge it is corrected and will not be present after the purge;
    D. means connected to said storing means and said purge means causing the above word level purge operation to be repeatedly performed once, on every one of the W words in turn, and at times when no data is being requested by the data users, such that the entire system of W words is purged of single bit errors at a frequency of 1/T seconds, such that no flip-flop in the system remains in an incorrect state for more than T seconds, and such that the chance of a flip-flop becoming incorrect while one of the other N+M−1 bits in the same word is incorrect, forming an uncorrectable double bit error, is a function of the time T rather than the time X between accesses to each word by the data users; the time T being very small compared to the time X normally used in reliability calculations such that the ratio T/X, the chance of an uncorrectable double bit error in the claimed system to the chance of an uncorrectable double bit error in a conventional error detection and correction system, is very small, at least X/T times as reliable as conventional error detection and correction systems.

2. A memory system as claimed in claim 1 wherein the flip-flops are contained in dynamic memory chips requiring periodic electrical refresh cycles, and the means to retrieve a word during each word level purge operation accomplishes the electrical refresh cycle as well, such that the retrieval cycles do not take cycles away from data users requesting access to the system.

3. A memory system as claimed in claim 1 wherein the means to retrieve the original N bits stored in a word includes means to determine the presence or absence of an error in one of the N+M flip-flops, and the means to purge each word of single bit errors includes means to perform the rewrite part of the purge cycle only if an error was present, such that the purge cycle takes a cycle away from data users requesting access to the system only when an error is encountered in the word being purged.

4. A memory system as defined in claims 1, 2 or 3 wherein T is less than 60.

5. A memory system as defined in claim 4 wherein T is less than 10.

6. For use in a digital computer system comprising a data memory and at least one data user, a system of reducing the occurrence of uncorrectable errors in a digital memory space of the data memory, said memory space storing a plurality of words at addressed word locations, each word comprising a first plurality of bits; said system further comprising means for storing a second plurality of error detecting bits for each said word; said method comprising the steps of:
    A. repeatedly reading out of said memory space in turn each and every one of said words, said readouts occurring at times when no readouts of said memory space are being requested by said data users and, the time between readouts of all of said words being very much shorter than the average time between the occurrence of successive uncorrectable errors;
    B. checking the read bits of said first plurality of bits of each said word and the corresponding said second plurality of bits to determine if a correctable bit error has occurred;
    C. if a correctable bit error has occurred, generating a corrected word; and,
    D. rerecording the corrected words in their addressed word locations.

7. The system of claim 6 wherein said digital memory space occurs in a Random Access Memory wherein each of said words is accessible to said data users in substantially equal time.

8. The system of claim 6 wherein said digital memory space requires repetitive readout and re-recording of said words and said comparing, generating, and recording steps are performed during said repetitive readout and re-recording of said words.

9. The system of claim 8 wherein said digital memory space is comprised in a Random Access Memory wherein each of said words is accessible to said data users in substantially equal time.

10. The method of claims 6, 7, 8 or 9, and
   D. further checking said first bits of each word and the corresponding said second bits to determine if an uncorrectable bit error has occurred; and
   E. disabling the addressed word location of each word in which an uncorrectable bit error has occurred.

11. The system of claim 10 wherein said memory space comprises a plurality of memory devices and said disabling means disables the memory device where an uncorrectable bit error has occurred.

12. The system of claim 10 wherein the time between said readouts of all of said words is less than 1 minute.

13. The system of claim 12 wherein the time between said readouts of all of said words is less than 10 seconds.

14. The system of claims 6, 7, 8 or 9 wherein the time between said readouts of all of said words is less than 1 minute.

15. The system of claim 14 wherein the time between said readouts of all of said words is less than 10 seconds.

16. For use in a digital computer system comprising a data memory and at least one data user, a system of systematically detecting and correcting errors in a directly addressable memory portion of said data memory comprising the steps of:
   A. repeatedly reading each and every directly addressable memory location in said directly addressable memory portion at least some times when reading is not requested by the data users;
   B. determining the presence or absence of correctable errors in the read data from each directly addressable memory location;
   C. if a correctable error is detected, correcting the error; and
   D. rewriting the corrected data into the same directly addressable memory location.

17. A system of systematically detecting and correcting errors in a directly addressable memory as defined in claim 16, wherein the directly addressable memory is periodically refreshed and wherein the systematic reading of each directly addressable memory location is performed during the periods of time when the memory is being refreshed.

18. A system of systematically detecting and correcting errors in a directly addressable memory as defined in claims 16 or 17, further comprising the step of:
   E. indicating to an interconnected device the presence of a corrected error in corrected data read by the interconnected device.

19. For use in a digital computer system comprising a data memory and at least one data user, a systematic error detection and correction system for use with a directly addressable portion of the data memory containing data bits, said system comprising:
   A. means for storing error correction code (ECC) bits associated with the data bits of each directly addressable memory location for determining the presence or absence of an error in the data bits at a directly addressable memory location;
   B. a data handler interconnected to the data memory and said storing means for determining by the ECC bits the presence or absence of an error in the data bits at a directly addressable memory location read from the memory;
   C. means, interconnected to the data handler, for correcting the read data if an error is detected by the data handler and rewriting the corrected data back into the directly addressable memory locations within the memory; and
   D. means for repeatedly reading the data and ECC bits associated with each and every directly addressable memory location in turn within the memory at least some times when reading is not requested by said data users.

20. A systematic error detection and correction system as defined in claim 19, wherein said data memory is a dynamic Random Access Memory wherein each of said memory locations is accessible to said data users in substantially equal time and said data memory is periodically refreshed and wherein the means for systematically reading the data and ECC bits from each directly addressable memory location performs such reading at least during some of the periods of time when the memory is being refreshed.

21. A systematic error detection and correction system as defined in claims 19 or 20, wherein the data handler further determines by the ECC bits and the data bits the presence or absence of an error in the ECC bits and wherein the means for correcting the read data further comprises means for correcting the ECC bits if an error is detected in them by the data handler.

22. A systematic error detection and correction system as defined in claim 21, wherein the data handler further comprises means for determining the presence or absence of an error whenever the directly addressable memory location is to be read from the memory by an interconnected device and wherein the means for correcting and rewriting the read data also performs such correction to the data when it is to be read by the interconnected device and also rewrites the corrected data into the memory.

23. A systematic error detection and correction system as defined in claims 19 or 20, wherein the data handler further comprises means for determining the presence or absence of an error whenever the directly addressable memory location is to be read from the memory by an interconnected device and wherein the means for correcting and rewriting the read data also performs such correction to the data when it is to be read by the interconnected device and also rewrite the corrected data into the memory.

24. A systematic error detection and correction system as defined in claims 19 or 20, wherein the data handler comprises means for detecting "soft", single bit errors, and "hard" multi-bit errors, and wherein the correcting and rewriting means only corrects and rewrites "soft" errors.

25. A systematic error detection and correcting system as defined in claim 24 wherein the system further comprises means, interconnected to the data handler, for indicating to the outside world the presence of a "soft" or "hard" error at an addressable memory location.

26. A systematic error detection and correction system as defined in claim 25, wherein the memory comprises a plurality of memory chips, including spare memory chips, and wherein the system further comprises means, interconnected to the data handler, and to the correcting and rewriting means, for substituting a spare memory chip for a memory chip in which a "hard" error is detected.

27. A systematic error detection and correction system as defined in claim 24, wherein the memory comprises a plurality of memory chips, including spare memory chips, and wherein the system further comprises means, interconnected to the data handler, and to the correcting and rewriting means, for substituting a spare memory chip for a memory chip in which a "hard" error is detected.

28. A systematic error detection and correction system as defined in claim 24, wherein the memory comprises a plurality of memory chips, and wherein the system further comprises means, interconnected to the data handler, and to the correcting and rewriting means, for isolating a chip on which a "hard" error has been detected.

29. A systematic error detection and correction system as defined in claims 19 or 20, wherein the system further comprises means, interconnected to the data handler, for indicating to the outside world the presence of an error at a directly addressable memory location.

30. A systematic error detection and correction system as defined in claim 29, wherein the error indicating means logs the locations in the directly addressable memory where the errors exist.

31. A systematic error detection and correction system as defined in claim 29, wherein the error indicating means logs the repetitiveness of the errors at any directly addressable memory location.

32. A systematic error detection and correction system as defined in claims 19 or 20, wherein each directly addressable memory location comprises one or more bytes and wherein the ECC bits are associated with the data bits of each byte so that the data handler and the correcting and rewriting means determine, correct and rewrite errors in the data bytes at each directly addressable memory location.

33. A systematic error detection and correction system as defined in claim 24, wherein each directly addressable memory location comprises one or more bytes and wherein the ECC bits are associated with the data bits of each byte so that the data handler and the correcting and rewriting means determine, correct and rewrite errors in the data bytes at each directly addressable memory location.

34. The system defined in claims 16, 17, 19 or 20, wherein said repeated reading occurs at least once each minute.

35. The system defined in claim 34 wherein said repeated reading occurs at least every 10 seconds.

36. The system defined in claim 35 wherein said memory is a Randon Access Memory in which each of said words is accessible to said data user in substantially equal time.

37. The system defined in claims 1, 2, 5, 16 or 17, wherein said memory is a Random Access Memory in which each of said words is accessible to said data user in substantially equal time.

38. In a dynamic RAM system cyclicly refreshing a memory space in a dynamic RAM thereof for storing addressed words of data comprising redundant bits for error detection; means for reducing the uncorrectable error rate of said system comprising:
A. means for supplying READ commands to each and every address of said memory space during said refresh cycle;
B. means connected to the dynamic RAM for checking each word read during a refresh cycle for correctable errors and for generating a corrected word if a correctable error has occurred; and
C. means connected to said checking means for rewriting into the dynamic RAM said corrected word during said refresh cycle.

39. A system as defined in claims 1, 6, 16, 19, or 38, wherein only corrected words are rewritten.

* * * * *

UNITED STATES PATENT AND TRADEMARK OFFICE
CERTIFICATE OF CORRECTION

PATENT NO. : 4,506,362
DATED : March 19, 1985
INVENTOR(S) : Richard E. Morley

It is certified that error appears in the above-identified patent and that said Letters Patent are hereby corrected as shown below:

Col. 2, line 17, delete "irrelevent" and substitute therefor --irrelevant--.

Col. 3, line 11, delete "directly addressable of" and substitute therefor --of directly addressable--.

Col. 3, line 46, delete "correctng" and substitute therefor --correcting--.

Col. 7, line 57, delete "c." and substitute therefor --C.--.

Col. 10, line 61, delete "correcting" and substitute therefor --correction--.

Signed and Sealed this

Fifteenth Day of December, 1987

Attest:

DONALD J. QUIGG

*Attesting Officer*  *Commissioner of Patents and Trademarks*